US011481460B2

(12) United States Patent
Camus et al.

(10) Patent No.: US 11,481,460 B2
(45) Date of Patent: Oct. 25, 2022

(54) SELECTING ITEMS OF INTEREST

(71) Applicant: INTERNATIONAL BUSINESS MACHINES CORPORATION, Armonk, NY (US)

(72) Inventors: Kelly Camus, Durham, NC (US); Shikhar Kwatra, Raleigh, NC (US); Reji Jose, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/918,034

(22) Filed: Jul. 1, 2020

(65) Prior Publication Data

US 2022/0004591 A1    Jan. 6, 2022

(51) Int. Cl.
*G06F 16/95* (2019.01)
*G06F 16/9535* (2019.01)
(Continued)

(52) U.S. Cl.
CPC .......... *G06F 16/9535* (2019.01); *G06F 3/011* (2013.01); *G10L 15/1815* (2013.01); *G10L 15/1822* (2013.01)

(58) Field of Classification Search
CPC ........................... G06F 16/9535; G06F 3/011
See application file for complete search history.

(56) References Cited

U.S. PATENT DOCUMENTS 8,219,438 B1    7/2012  Moon et al.
8,429,244 B2    4/2013  Naimark et al.
(Continued)

FOREIGN PATENT DOCUMENTS

CN    104898971 B    12/2017
CN    107886410 A     4/2018

OTHER PUBLICATIONS

Mahmoud, et al., "Interpreting Hand-Over-Face Gestures," In: D'Mello S., Graesser A., Schuller B., Martin JC. (eds) Affective Computing and Intelligent Interaction. ACII 2011. Lecture Notes in Computer Science, vol. 6975, Springer, Berlin, Heidelberg, https://link.springer.com/chapter/10.1007/978-3-642-24571-8_27, 2011, pp. 1-8.

(Continued)

*Primary Examiner* — Eliyah S. Harper
(74) *Attorney, Agent, or Firm* — David Spalding (57) ABSTRACT

A method comprises displaying a plurality of items to a user on a first page on a display screen of an electronic device. Each item of the plurality of items displayed on the first page is classified according to whether an item is of interest to the user viewing the display screen. A correlation factor between the user and each item classified as of interest to the user is determined. The method also includes, for at least the first one of the plurality of items determined to have a correlation factor above a predetermined threshold, identifying detailed information about a first one of the plurality of items. The identified detailed information about a first one of the plurality of items is automatically displayed. The identified detailed information is displayed without receiving an input indicating a selection of a first one of the plurality of items from a hand-operated input device.

20 Claims, 7 Drawing Sheets

(51) Int. Cl.
*G10L 15/18* (2013.01)
*G06F 3/01* (2006.01)

(56) References Cited

U.S. PATENT DOCUMENTS

| | | | | |
|---|---|---|---|---|
| 9,875,225 | B1* | 1/2018 | Grueneberg | H05K 999/99 |
| 10,089,290 | B2* | 10/2018 | Grueneberg | G06F 40/169 |
| 10,127,593 | B2 | 11/2018 | Gu et al. | |
| 10,268,660 | B1* | 4/2019 | Arazi | G06F 17/18 |
| 2005/0069207 | A1* | 3/2005 | Zakrzewski | G06K 9/626 |
| | | | | 382/218 |
| 2006/0104515 | A1* | 5/2006 | King | G06F 16/93 |
| | | | | 382/190 |
| 2006/0112146 | A1* | 5/2006 | Song | G06Q 10/10 |
| 2007/0244750 | A1* | 10/2007 | Grannan | G06Q 30/0258 |
| | | | | 705/14.56 |
| 2008/0228675 | A1* | 9/2008 | Duffy | G06F 40/295 |
| | | | | 707/999.005 |
| 2008/0281687 | A1* | 11/2008 | Hurwitz | G06Q 30/0255 |
| | | | | 705/14.1 |
| 2011/0078585 | A1* | 3/2011 | King | G06Q 30/02 |
| | | | | 715/751 |
| 2015/0313530 | A1* | 11/2015 | Kodra | G16H 50/70 |
| | | | | 382/203 |
| 2016/0196603 | A1 | 7/2016 | Perez et al. | |
| 2019/0147334 | A1* | 5/2019 | Lisowska | G06N 3/08 |
| | | | | 706/25 |
| 2019/0231253 | A1* | 8/2019 | Ahmed | A61B 5/6817 |
| 2019/0311275 | A1* | 10/2019 | Huang | G06N 5/022 |
| 2021/0005224 | A1* | 1/2021 | Rothschild | H04N 9/8205 |
| 2021/0140787 | A1* | 5/2021 | Zilberman | G01C 21/3679 |
| 2021/0142187 | A1* | 5/2021 | Zilberman | G06Q 50/01 |
| 2021/0142435 | A1* | 5/2021 | Zilberman | G06Q 50/30 |
| 2022/0189076 | A1* | 6/2022 | Coppin | G06V 40/174 |

OTHER PUBLICATIONS

Mell et al., "The NIST Definition of Cloud Computing", National Institute of Standards and Technology, Special Publication 800-145, Sep. 2011, pp. 1-7.

* cited by examiner

SELECTING ITEMS OF INTEREST

BACKGROUND

Embodiments relate, generally, to the field of computing, and more specifically to selection of an item from a list on a webpage based on determination of a user's interest in an item.

It is very common for computer users to browse webpages for information about a variety of aspects of daily life. The vast amount of information available to the user is frequently displayed in a list that requires filtering by the user. The list usually includes previews of its contents that can be used to learn more about the items on the list and assist the user in this filtering. This preview information also typically includes links that can be selected by the user to get more details and make informed decisions about whether the item is desired by the user.

SUMMARY

Embodiments of the present invention disclose a computer-implemented method for selecting items on a webpage, including displaying a plurality of items to a user on a first page on a display screen of an electronic device, classifying each item of the plurality of items displayed on the first page according to whether an item is of interest to the user viewing the display screen, determining a correlation factor between the user and each item classified to be of interest to the user, identifying detailed information about at least the first one of the plurality of items determined to have a correlation factor above a predetermined threshold and automatically displaying the identified detailed information about a first one of the plurality of items without receiving an input indicating a selection of a first one of the plurality of items from a hand-operated input device.

In accordance with other embodiments, a computer program product is provided for selecting items on a webpage. The computer program product comprises a computer readable storage device storing computer readable program code embodied therewith, the computer readable program code comprising program code executable by a computer to perform a method. The method comprises displaying a plurality of items to a user on a first page on a display screen of an electronic device. Each item of the plurality of items displayed on the first page is classified according to whether an item is of interest to the user viewing the display screen. A correlation factor between the user and each item classified to be of interest to the user is determined. The method also includes, for at least the first one of the plurality of items determined to have a correlation factor above a predetermined threshold, identifying detailed information about a first one of the plurality of items. The identified detailed information about a first one of the plurality of items is automatically displayed. The identified detailed information is displayed without receiving an input indicating a selection of a first one of the plurality of items from a hand-operated input device.

In accordance with yet other embodiments, a computer system is provided for selecting items on a webpage. The computer system comprises one or more processors, one or more computer-readable memories, one or more computer-readable tangible storage media, and program instructions stored on at least one of the one or more tangible storage media for execution by at least one of the one or more processors via at least one of the one or more memories. The computer system is capable of performing a method for selecting items on a webpage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Finding information online can entail a rather laborious manual effort from the user. While a general search can be simple, this may result in the generation of a large and multi-paged list of items that must be filtered further. The user must select the desired items from the list, which frequently displays a preview of the items with a link to find more details about the selected item. In a given search, users may view many items to learn more and potentially compare them (both inside and outside the website) before deciding on a course of action. That makes this manual effort not only a greater inconvenience but also makes the experience more time consuming. Another aspect of known methods is that the use of at least one hand is required to select a displayed item of interest, e.g., to move a mouse, move a finger on a track pad, or otherwise provide physical contact to an input device. This aspect maybe a disadvantage for a user who is unable to use his or her hands either because of paralysis, pain, or simply because the person's hands are simultaneously being used for another purpose. One way to ease this burden is to make the system cognizant of a user's specific interests in a personalized and unique way so that the user has a faster and more convenient experience.

According to one embodiment, a user wants to buy an audio surround sound speaker system and navigates to a retailer's website. He starts browsing various speaker systems that are available for purchase and selects a category of speaker systems which displays twenty speaker systems on the first page and there are many more subsequent pages. The web page may display an icon, thumbnail image, text, or some combination as a preview for each item ("preview item"). The preview items may be displayed on the web page in rows of four or five as one example. On the first page, the user does not like the first two speaker systems that are shown in a particular row but does like the third option in the same or another row. The website is configured so that when a user clicks the preview item of interest, i.e. the third item, product details for the item of interest are displayed to him on a separate screen. According to various embodiments, the product details page for the item of interest is dynamically displayed. In addition, further product details are obtained from sources other than the web site the user is viewing, e.g. external websites, may be obtained and displayed. In various embodiments, a determination of the user's level of interest in a displayed preview item may take into account external factors (IoT devices and pattern history in conjunction with big data sources). Advantageously, the user does not need use his or her hands to select any link or external website when he or she is interested in an item.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
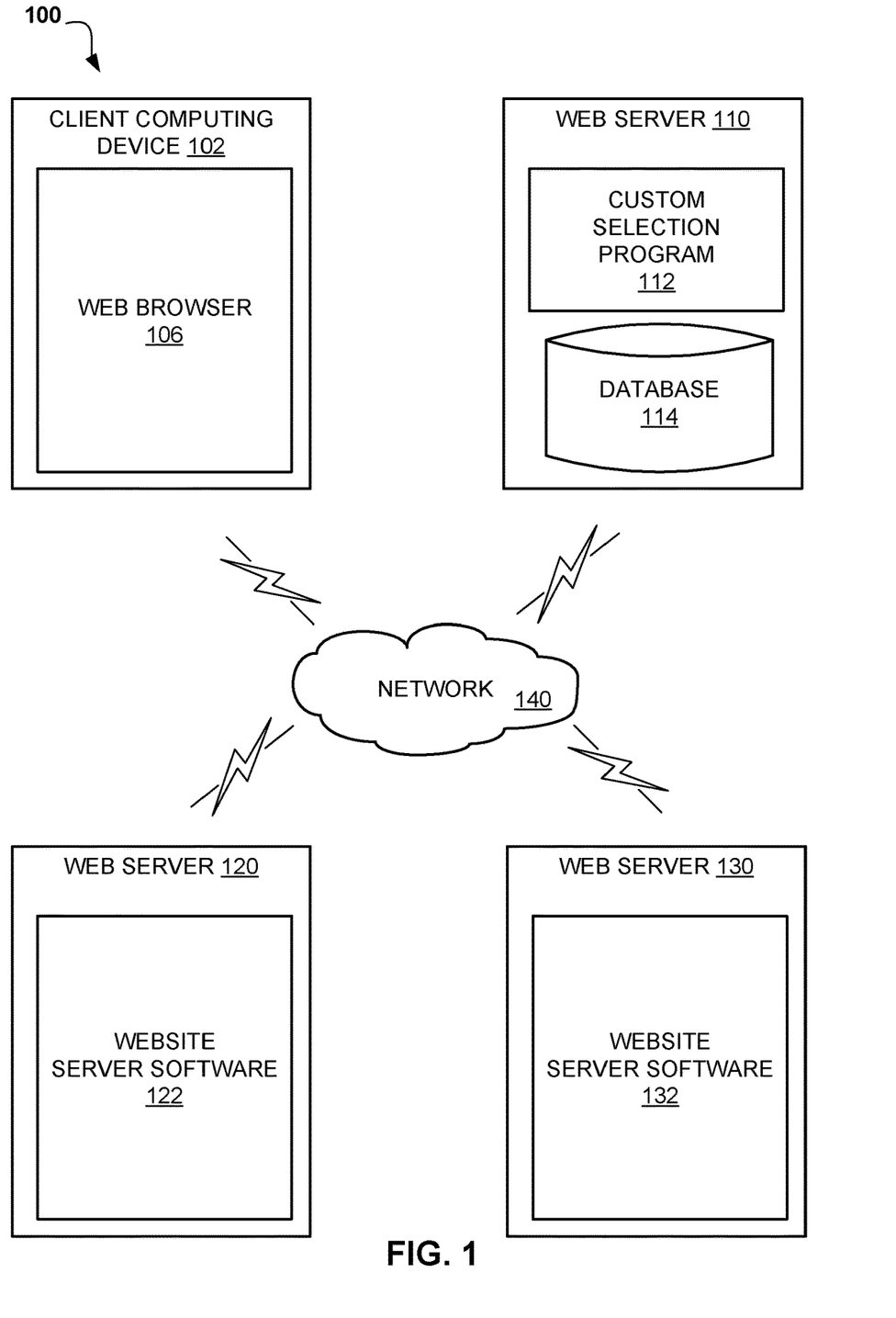
FIG. 1 describes a block diagram of a computing system that will be used to browse the Internet by a user, including devices that will be used to learn characteristics from the user according to an embodiment.

Referring now to FIG. 1, a block diagram of a computing system that may be used to browse the Internet by a user is described, including devices that may be used to learn characteristics from the user according to at least one embodiment. The networked computer environment 100 may include a client computing device 102 and web servers 110, 120, 130, interconnected via a communication network 140. According to at least one implementation, the networked computer environment 100 may include a plurality of client computing devices 102 of which only one is shown for illustrative brevity.

The communication network 140 may include various types of communication networks, such as a wide area network (WAN), local area network (LAN), a telecommunication network, a wireless network, a public switched network and/or a satellite network. The communication network 140 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a web browser 106 displaying a internal website and communicating with the web servers 110, 120, 130 via the communication network 140, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The web server 110 may be a laptop computer, netbook computer, personal computer (PC), a desktop computer, or any programmable electronic device or any network of programmable electronic devices capable of hosting and running the custom selection program 112 and a database 114. The web servers 120, 130 may be a laptop computer, netbook computer, personal computer (PC), a desktop computer, or any programmable electronic device or any network of programmable electronic devices capable of hosting and running the website server software 122, 132. The web servers 110, 120, 130 communicate with the client computing device 102 via the communication network 140, in accordance with embodiments of the invention. As will be discussed with reference to FIG. 5, the web servers 110, 120, 130 may each include internal components 502b and external components 504b, respectively. As will be discussed with reference to FIGS. 6 and 7, the web servers 110, 120, 130 may also operate in a cloud computing service model, such as Software as a Service (SaaS), Platform as a Service (PaaS), or Infrastructure as a Service (IaaS). The web servers 110, 120, 130 may also be located in a cloud computing deployment model, such as a private cloud, community cloud, public cloud, or hybrid cloud.

According to the present embodiment, the custom selection program 112 may be a program capable of determining the interest of a user in an item based on eye detection and facial recognition, biometric data, sentiment from words spoken and user history such as social media profiles and posts or manually entered requirement. The custom selection process is explained in further detail below with respect to FIG. 2.

Figure 2:
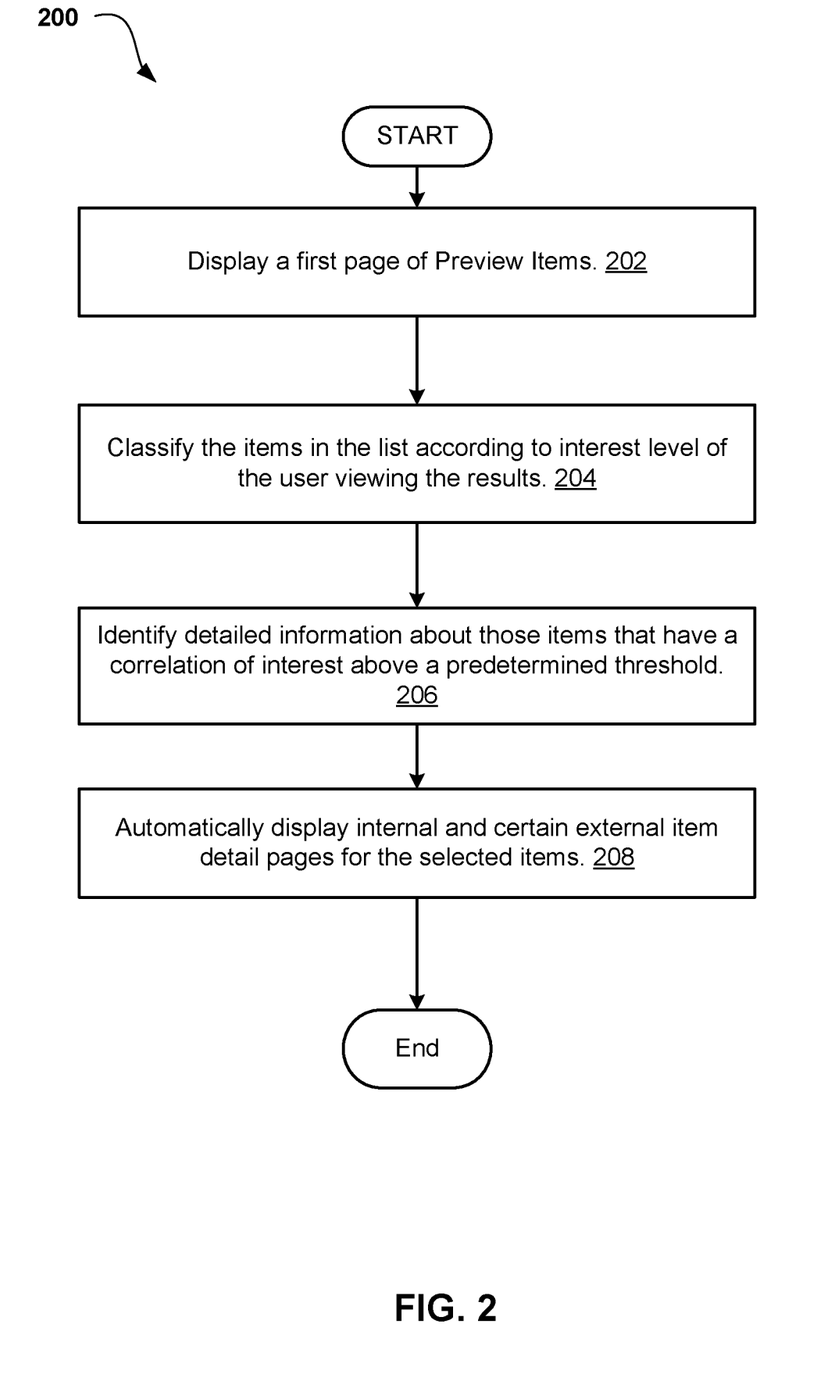
FIG. 2 shows a method for collecting information and displaying a first webpage with a list of items, correlating the user's navigation of the list with a set of characteristics collected from the devices indicated in FIG. 1 as well as other sources, and displaying a filtered list of items for the user's consideration according to an embodiment.

Referring to FIG. 2, an operational flowchart illustrating a custom item selection process 200 is depicted according to at least one embodiment. At 202, user conducts a search for information with the web browser 106 on the client computing device 102. The web browser 106 is connected to the web server 120 and the user performs a search of the website server software 122 to display a first page of items, the results of the search. It should be appreciated that it is not essential that the first page of preview items be displayed in response to a web browser search of websites. For example, the first page of preview items may be displayed in response to an internal search of a particular website. In addition, the first page of preview items may be displayed in response to another command, such as selecting a category of items.

Figure 3:
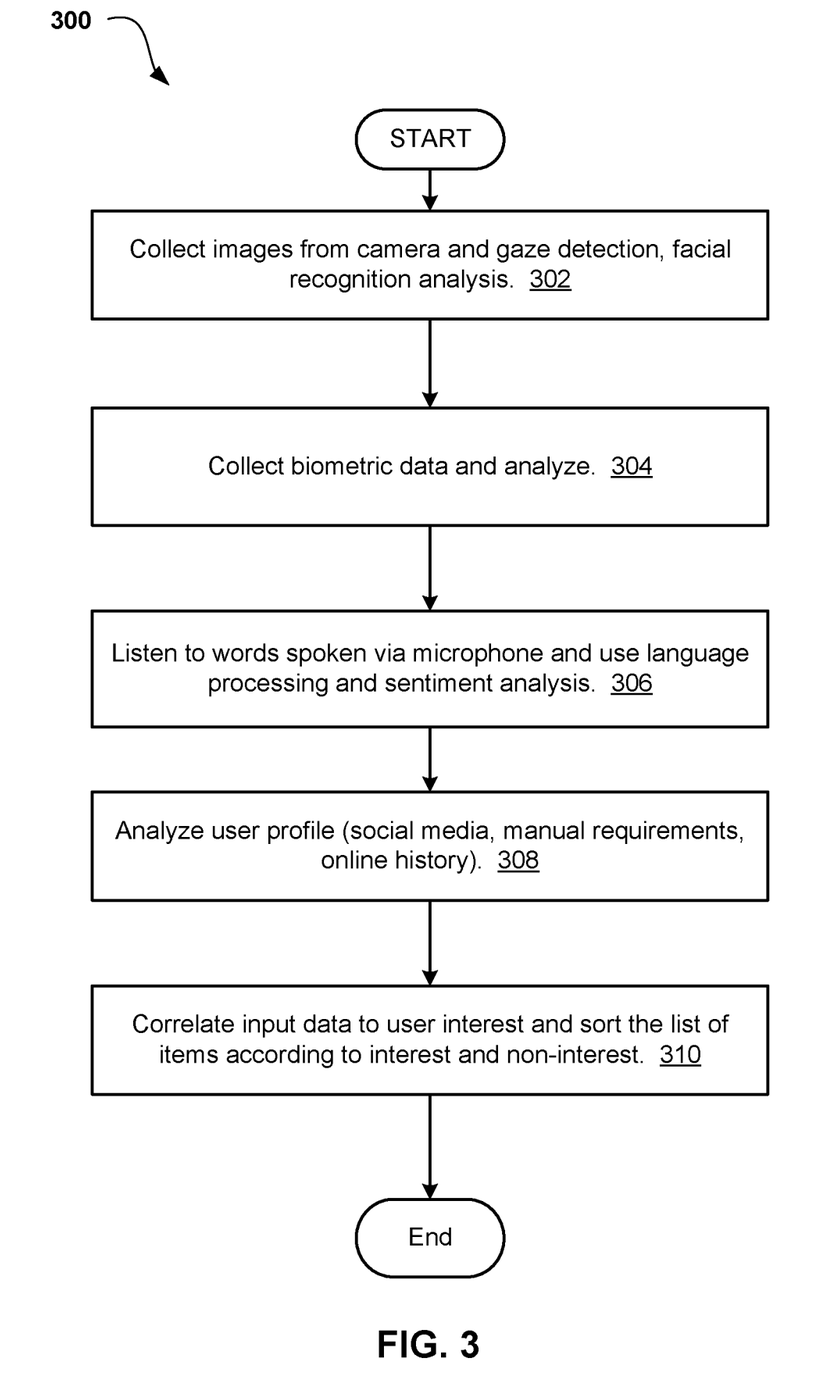
FIG. 3 shows a method used to process the user characteristics according to an embodiment.

At 204, an interest level of the user in the items on the first page is determined. According to one embodiment, the custom item selection program 112 interfaces with a camera to collect images of the user to detect eye and body movements of the user and conduct facial recognition that may indicate interest of the user in certain items within the list of results. Once interest is indicated by the user, additional analysis techniques which are explained in further detail below with respect to FIG. 3 are employed, such as analysis of biometric data collected from a smart device on a user, language processing and sentiment analysis of words spoken by the user that are detected by a microphone and analysis of the available online history of the user, including social media posts and profiles, specific desires or requirements entered manually by a user as well as Internet browsing history. The custom item selection program 112 processes these inputs and classifies the items in the first page of results according to user interest.

At 206, detailed information about one or more of the items that have been classified to be of interest to the user is identified. Detailed information for items classified to be of interest to the user may be determined for items having a correlation factor above a predetermined threshold. As one example of a correlation factor, a Pearson correlation may be calculated for the positively classified items from 204. The Pearson correlation may be used to establish a correlation between a user and an item to determine the association between the user and their interest in the item. Detailed information is identified for only those items that have a correlation factor above a predetermined threshold. A Pearson correlation coefficient has a value between +1 and −1, where 1 is total positive linear correlation, 0 is no linear correlation, and −1 is total negative linear correlation. As one example, the predetermined threshold may be +0.1.

Identifying detailed information for an item includes identifying any product details page linked to the presentation item displayed on the first web page. In addition, the identifying detailed information may include searching various data sources, like social media and web sites containing information on the item. In one embodiment, the custom item selection program 112 may interface with a program that systematically searches the Internet, known as a "web crawler", to find one or more appropriate web servers 130 from which it will pull information about the items.

Operation 206 may include deriving specific types of details about the item that should be identified for the classified items having a correlation factor above a predetermined threshold. The specific types of details to be derived may be based on the type of item or a user profile or both. The derived information may be compared with the information on a predefined item details page. If any part or subset of the derived information is missing on the item details page, an Internet search may be performed to obtain the missing information. For example, a user may be looking for a specific feature of the items, such as a mobile phone that has a dual SIM, and that information is not available on the default item details screen. The custom item selection program 112 could identify the desired feature using natural language processing techniques and perform a web search as described. Additional description information from the top 3 websites which is missing in the default product details page could be combined and appended to the product description in the default product details page.

At 208, the custom item selection program 112 automatically displays the detailed information about a first one of a plurality of items identified in 206. The identified detailed information may be displayed without receiving an input indicating a selection of a first one of the plurality of items from a hand-operated input device. If it is determined that the user is interested in a specific item, that will trigger display of the detailed information page. Optionally, external websites containing relevant detailed information may also be displayed. As new data becomes available, the system may automatically update the display of detailed information so that the data is most current.

Referring to FIG. 3, an operational flowchart illustrating a process 300 for classifying each item of a plurality of items displayed on a first page according to whether an item is of interest to the user viewing the display screen is depicted according to at least one embodiment. The process 300 may correspond with operation 204. At 302, the custom item selection program 112 may interface with a camera to acquire images of the user such that the user's interest in the current item in the search results can be determined. In some embodiments, two or more cameras may be employed, e.g., a first camera built into a computer and a second camera separate from the computer, e.g., an Internet-of-Things ("IoT") device having a camera. Two or more cameras may be used to capture views from different angles or distances, or different portions of a user. For example, one camera may capture a user's face and a second camera may capture a user's torso and arms. Images captured by the one or more cameras may be used to analyze one or more of a facial expression, an eye movement, or a body movement of the user in the one or more images of the user captured at a first time.

In various embodiments, captured images may be analyzed to detect the presence of a human face and to identify individuals. A machine learning-based face detection algorithm may be employed. The orientation of the face and particular facial features such as eyes, eyebrows, nose, and mouth may be identified. A determined orientation of the face may be used to determine whether the user is looking at the display or elsewhere. Eye tracking techniques may be used to determine which item on the screen the user is looking along at at a particular point in time. The item on the screen the user is looking at at a particular point in time may be referred to as a "current" item. Image analysis of the user's eyes with respect to a current image may also be used to determine the duration of the user's gaze and whether the user's pupils are dilated, either of which may indicate interest. Image analysis of a current image may also be used to determine whether the user's facial expression corresponds with interest in the current item. Image analysis may be used to determine if a user's gaze is directed to a particular image more than one time. Like longer view duration, a user who focuses on a same item two or more times, e.g. repeated views, in either a single or two or more viewing sessions, may be taken as an indication of user interest in the item.

Real-time gesture analysis may also be performed via a combination of one or more of edge detection, skin detection, and skeletal-based algorithms to determine if the user has an interest in the current item based on a body movement or gesture of the user. A direction toward which a user is facing may be determined. Gestures of the user may be determined from the captured images. As one example, distance and orientation of the user's body relative to the display may be determined. For example, it may be inferred that the user is interested in an item the user is focused on (as determined by eye tracking) from a user's body, e.g., torso, leaning closer to or away from the display. A user's posture may indicate interest. As another example, a gesture of the head or face may be determined, e.g., a hand or head motion. For example, a user may nod or move their head from side to side. A user may make a motion toward the item with her hand. A gesture may include both the head and face. This type of gesture may be referred to in the art as "hand-over-face" gestures. Hand-over-face gestures may take hand shape, hand action, and a facial region into account. Hand-over-face gestures may serve as affective clues. For example, a hand placed to various points on the face, in various configurations may indicate choosing, thinking, evaluating, interest/evaluation, evaluation/skepticism, deception or suspicion or boredom with an item being viewed. See Interpreting Hand-Over-Face Gestures, Mahmoud, Marwa; Robinson, Peter, University of Cambridge, 2011. For instance, a user stroking his chin using his index finger and thumb may indicate choosing, which may be used to infer interest. Any analysis results may be stored in the database 114 for use in determining positive or negative interest in future items or whether a current item is of interest to the user.

At 304, the custom item selection program 112 may utilize mobile or wearable devices such as a smartphone or a smartwatch that can provide certain biometric data (e.g., temperature or heartbeat) such that the user's reaction to the current item in the search results can be determined. In an embodiment, a wearable electronic device may communicate with another computing device (e.g., via Bluetooth or wireless connection). For example, a sudden increase in the user's heart rate may indicate excitement for the current item. Any analysis results, including the time the biometric data was captured, may be stored in the database 114 for assistance in determining positive or negative interest in future items or for use in the interest level calculation. The biometric data analysis results may be used in the classification of each item of the plurality of items displayed on the first page to determine whether a current item is of interest to the user.

At 306, the custom item selection program 112 may interface with a microphone to determine if the user has spoken any words or made any sounds such that the user's interest in the current item can be determined. For example, any parallel conversations (over phone or in person) while browsing could be analyzed. Natural language processing ("NLP") techniques may be used to convert the speech to text and sentiment analysis could then be used on the text to assess whether the context of the conversation relates to a current item. If it is determined via eye tracking that the user is focused on a particular item and, at substantially the same time, the user talks about the item with another person nearby or on the phone, the user's interest in the item may be inferred, depending on the meaning and sentiment of the spoken language, "this looks interesting." It is not required that the words uttered by a user be spoken to another person; the user may talk to herself. Sentiment analysis of spoken words may include volume and tone of the speaker. Any analysis results may be stored in the database 114 for use in determining positive or negative interest in future items or whether a current item is of interest to the user.

At 308, the custom item selection program 112 may interface with web servers to find an online history of the user. Examples of available online historical data are purchase history (the user has bought a particular product or type of products more frequently), item category/attributes (the user only considers buying electronic devices that have fingerprint support), social network posts or profiles (the user blogged or shared interest in a product over his/her social network), IoT data (an IoT server in the cloud may have information on what the user is interested in, based on the data from his/her smart home and office). This online historical data for the user may be analyzed and combined to generate a user profile containing a history of items purchased or viewed by the user, and interests of the user determined from social media. The profile data of the user may be analyzed to determine product category or attribute requirements of the user. Any analysis results may be stored in the database 114 for use in determining positive or negative interest in future items or whether a current item is of interest to the user.

At 310, each item of the plurality of items displayed on the first page is classified according to whether an item is of interest to the user is based on a machine learning classification model that predicts interest of a user in each of the plurality of items. One or more of the following machine learning algorithms may be used: logistic regression, naive Bayes, support vector machines, artificial neural networks, and random forests. In an embodiment, an ensemble learning technique is employed that uses multiple machine learning algorithms together to assure better prediction when compared with the prediction of a single machine learning algorithm. The training data for the machine learning algorithms may be collected from a single user. The machine learning models may be used to determine a user's interest in an item in a personal, customized way to account for the individual differences that exist in how people choose. In some embodiments, training data is collected from a group of users. In either case, training data is not collected unless the user consents. The training data may include some or all of the data collected in operations 302, 304, 306, and 308 of process 300. The classification may be utilized to boost the Pearson correlation score that is determined in 206 as to whether a user will be interested in an item and seeing the full item details. The classification results may be stored in the database 114 so that the data is most current, and the output would always be up to date.

Figure 4:
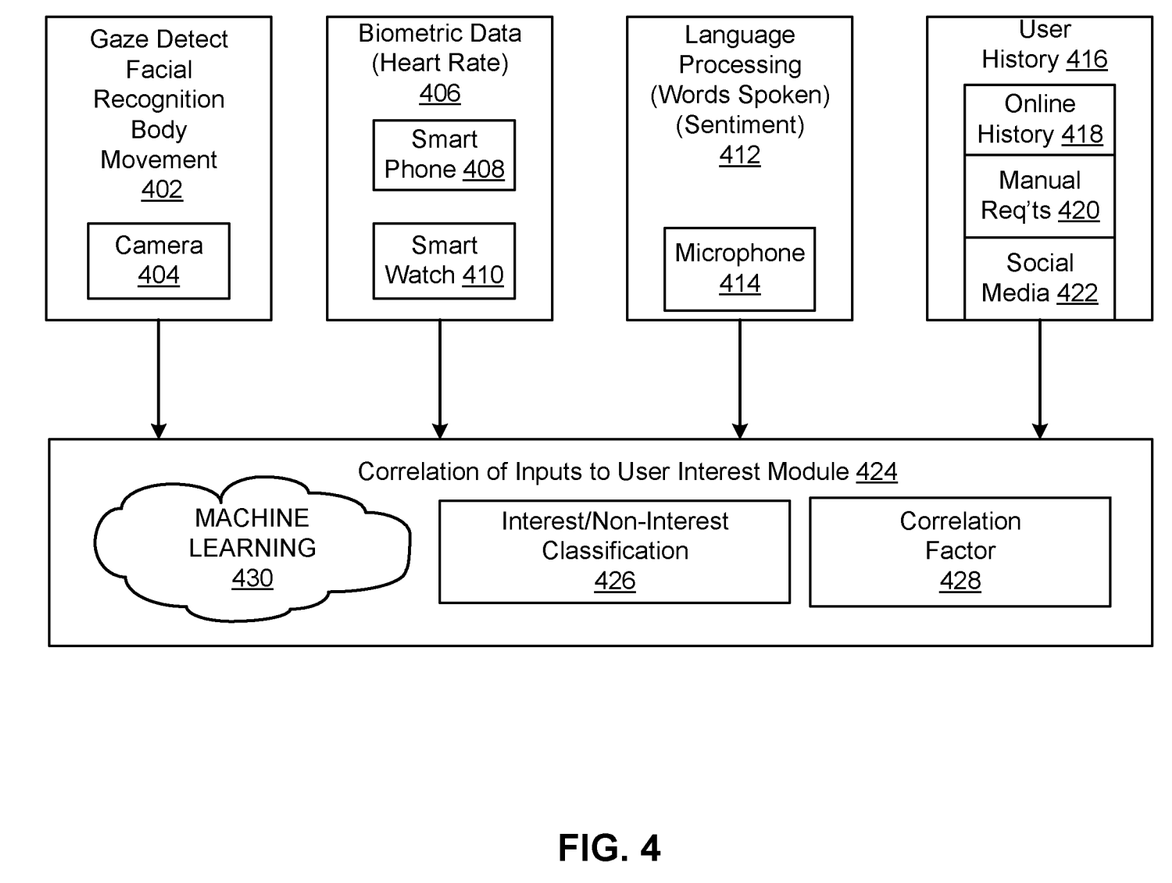
FIG. 4 shows an exemplary diagram depicting the custom item selection process according to at least one embodiment.

Referring now to FIG. 4, a diagram showing examples of components or modules of a custom item selection process, e.g., custom item selection program 112, and hardware components according to at least one embodiment. According to one embodiment, the custom item selection program 112 may include correlation of inputs to user interest module 424 which utilizes supervised machine learning 430 to determine user interest in a list of items based on two calculations: classification of an item into interested and not interested categories 426 and determination of a correlation factor 428, e.g., a Pearson correlation factor. In one embodiment, the custom item selection program 112 may use the facial recognition algorithms and analysis of eye and body movements 402 described above with respect to operation 302. The custom item selection program 112 may also monitor biometric data of the user 406 as described above with respect to operation 304. The custom item selection program 112 may also analyze words spoken by the user for sentiment or through language processing 412 as described above with respect to operation 306. The custom item selection program 112 may use user profile data 416 as described above with respect to operation 308. The custom item selection program 112 may utilize a camera 404 to take images of the user for use in the analysis of eye and body movements 402. For instance, the user may indicate interest in an item based on where they look or certain gestures and expressions. The custom item selection program 112 may utilize a smartphone 408 and/or smartwatch 410 to retrieve the user's biometric data 406. For instance, the user may indicate interest in an item based on an elevation in heart rate or breathing. The custom item selection program 112 may also utilize a microphone 414 to listen to words spoken by a user. For instance, a user may indicate interest in an item through an audible sound or with certain words. The custom item selection program 112 may also utilize online browsing history 418, any preferences or requirements entered manually 418 or social media posts or profiles 420. For instance, the user may have indicated interest in an item through their previous online activity. Classification 426 and the correlation factor 428 components use the above information to determine whether an item is of interest to the user as described above with respect to operations 206 and 308. For instance, a user may verbalize that they like a given item and also have an elevated heart rate when they view that item. The custom item selection program 112 may classify the given item as of interest to the user and calculate a Pearson correlation factor that is above a threshold.

Figure 5:
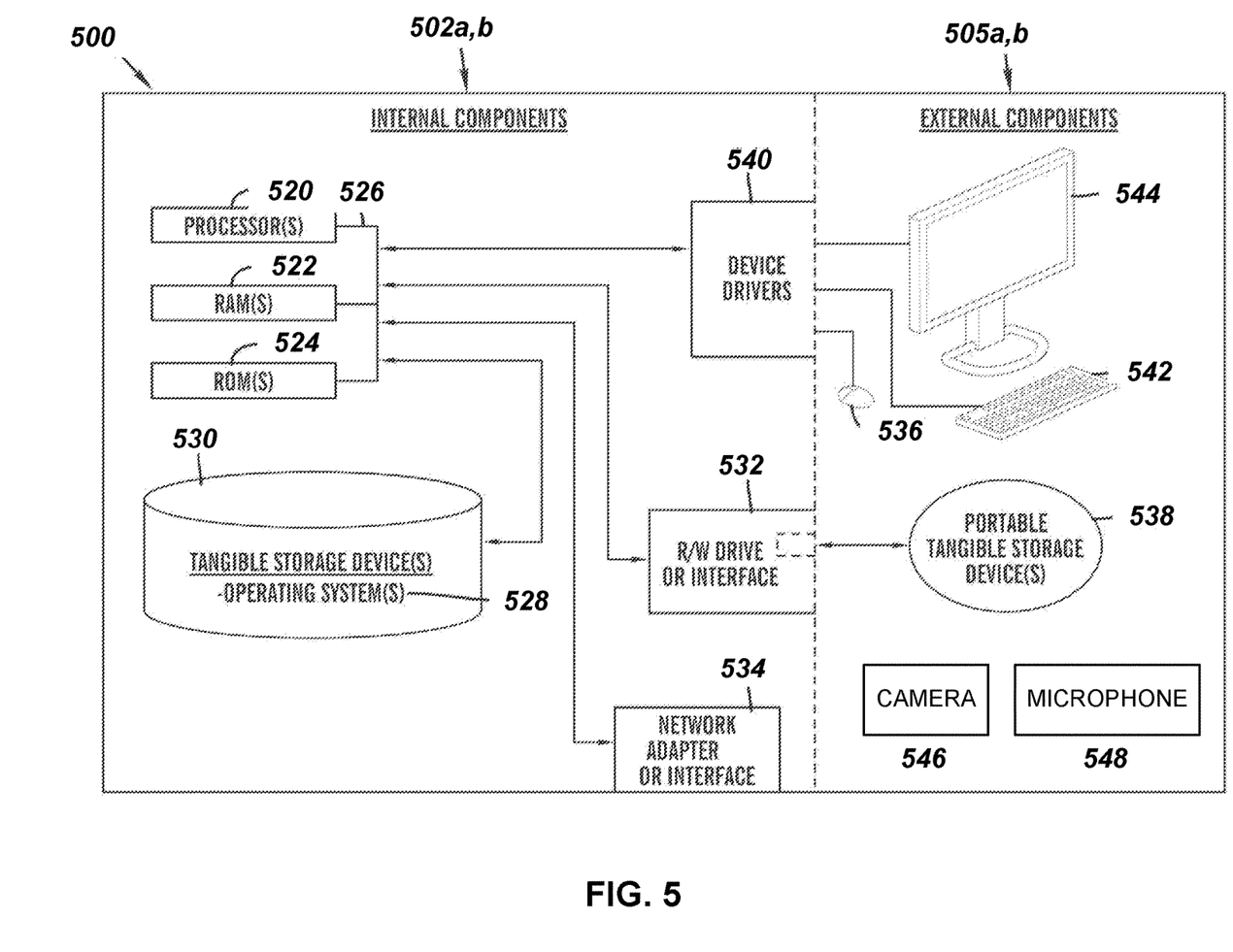
FIG. 5 shows a block diagram of internal and external components of computers and servers depicted in FIG. 1 according to at least one embodiment.

Referring to FIG. 5, a block diagram is shown of the internal and external components of the client computing device 102, the internal web server 110 and external web server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smartphone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the internal web server 112 and the external web server 120 may include respective sets of internal components 502*a,b* and external components 504*a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the web browser 106 and the custom selection program 110A in the client computing device 102, the custom selection program 110B in the internal web server 112 and the website server software 124 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502*a,b* also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the custom selection program 112 can be stored on one or more of the respective portable computer-readable tangible storage devices 538, read via the respective R/W drive or interface 532 and loaded into the respective hard drive 530.

Each set of internal components 502*a,b* also includes network adapters or interfaces 536 such as a TCP/IP adapter cards, wireless Wi-Fi interface cards, or 3G or 4G wireless interface cards or other wired or wireless communication links. The web browser 106 in the client computing device 102, the custom selection program 112 in the internal web server computer 110 and the website server software 122 in the external web server computer 120 can communicate with external computers via a network (for example, the Internet, a local area network or other, wide area network) and respective network adapters or interfaces 536. From the network adapters or interfaces 536, the web browser 106 in the client computing device 102, the custom selection program 112 in the internal web server computer110 and the website server software 122 in the external web server 120 are loaded into the respective hard drive 530. The network may comprise copper wires, optical fibers, wireless transmission, routers, firewalls, switches, gateway computers and/or edge servers.

Each of the sets of external components 504*a,b* can include a computer display monitor 544, a keyboard 542, and a computer mouse 534. External components 504*a,b* can also include touch screens, virtual keyboards, touch pads, pointing devices, and other human interface devices. Each of the sets of internal components 502*a,b* also includes device drivers 540 to interface to computer display monitor 544, keyboard 542, and computer mouse 534, as well as a camera 546 and microphone 548. The device drivers 540, R/W drive or interface 532, and network adapter or interface 536 comprise hardware and software (stored in storage device 530 and/or ROM 524). It should be understood that the keyboard 544, mouse 534, a touch screen, touchpad or any other device that a user would operate by hand to provide input to the computer may collectively be known as "hand-operated input devices."

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
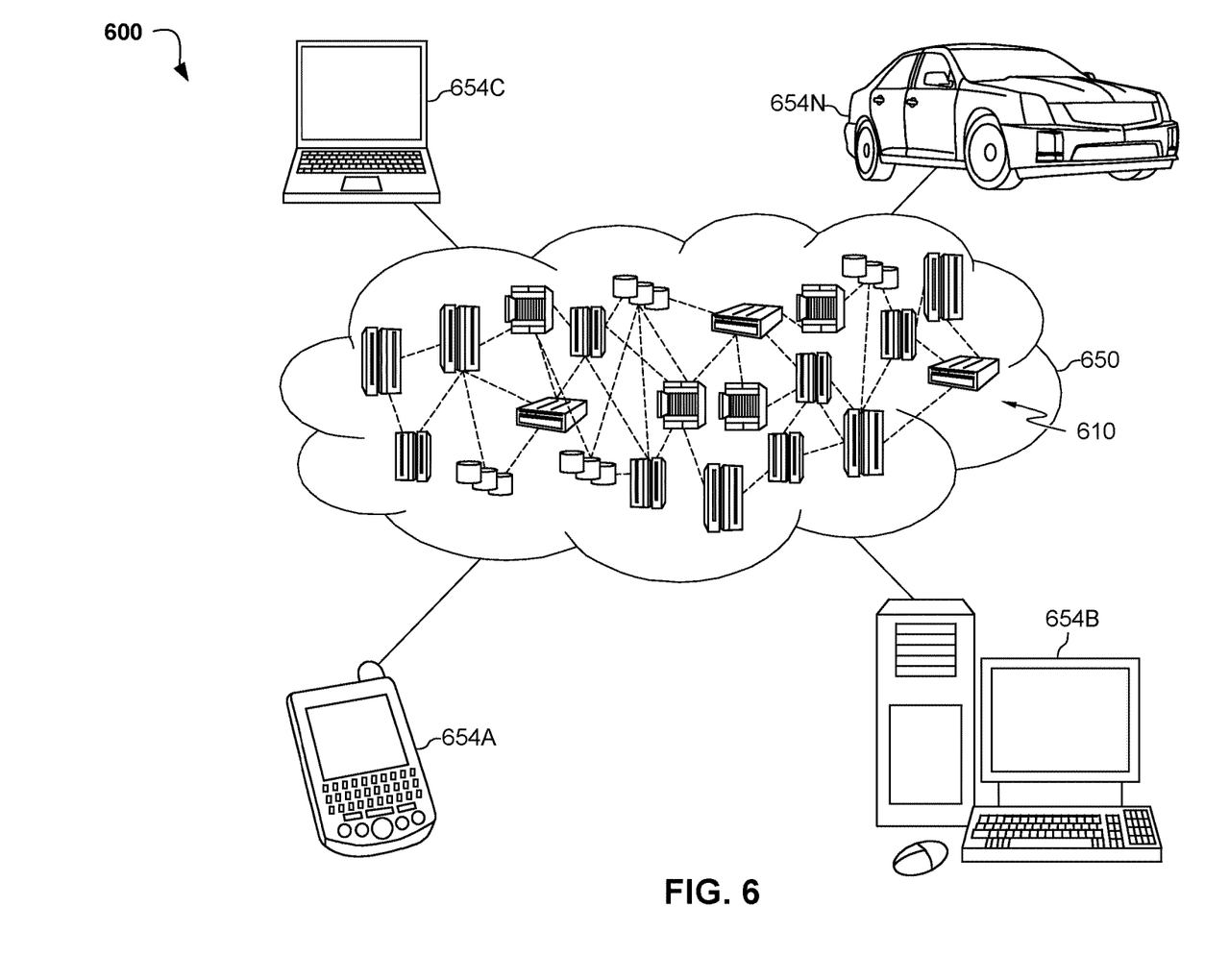
FIG. 6 depicts a cloud computing environment according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
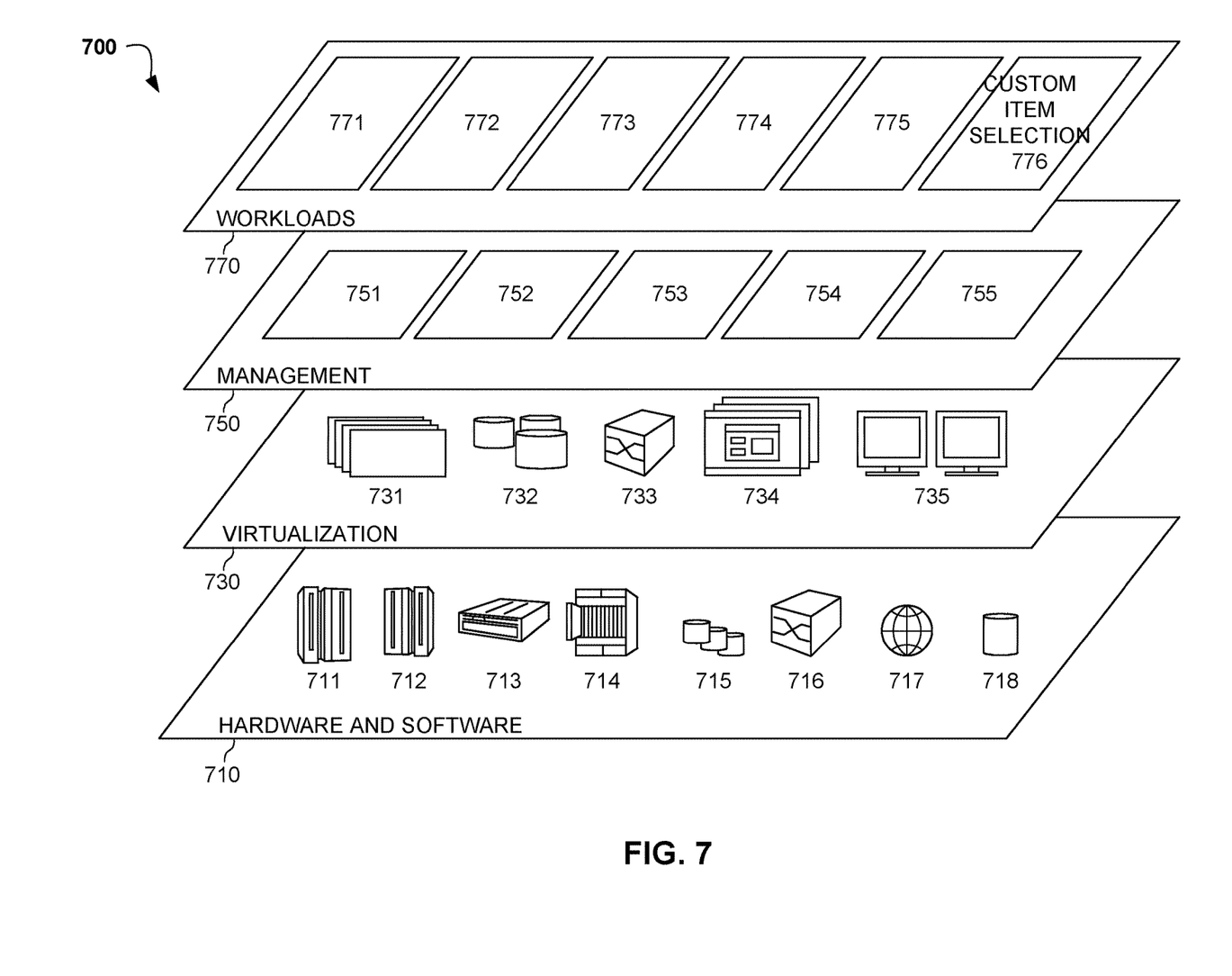
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes 711; RISC (Reduced Instruction Set Computer) architecture based servers 712; servers 713; blade servers 714; storage devices 715; and networks and networking components 716. In some embodiments, software components include network application server software 717 and database software 718.

Virtualization layer 730 provides an abstraction layer from which the following examples of virtual entities may be provided: virtual servers 731; virtual storage 732; virtual networks 733, including virtual private networks; virtual applications and operating systems 734; and virtual clients 735.

In one example, management layer 750 may provide the functions described below. Resource provisioning 751 provides dynamic procurement of computing resources and other resources that are utilized to perform tasks within the cloud computing environment. Metering and Pricing 752 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 753 provides access to the cloud computing environment for consumers and system administrators. Service level management 754 provides cloud computing resource allocation and management such that required service levels are met. Service Level Agreement (SLA) planning and fulfillment 755 provide pre-arrangement for, and procurement of, cloud computing resources for which a future requirement is anticipated in accordance with an SLA.

Workloads layer 770 provides examples of functionality for which the cloud computing environment may be utilized. Examples of workloads and functions which may be provided from this layer include: mapping and navigation 771; software development and lifecycle management 772; virtual classroom education delivery 773; data analytics processing 774; transaction processing 775; and custom item selection 776. Custom item selection 776 may relate to selection and automatic display of information relevant to items based on interest level determined from user data, including available images, biometric data, spoken words or user history.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting items on a webpage, the method comprising:
    displaying a plurality of items to a user on a first page on a display screen of an electronic device;
    determining whether an item is interesting to the user by analyzing physical characteristics of the user;
    classifying each item of the plurality of items displayed on the first page based on a determined interest to the user;
    determining a correlation factor between the user and the item when the item is classified as interesting to the user;

for at least the first one of the plurality of items determined to have a correlation factor above a predetermined threshold, identifying detailed information about a first one of the plurality of items; and automatically displaying the identified detailed information about a first one of the plurality of items without receiving an input indicating a selection of a first one of the plurality of items from a hand-operated input device.

2. The method of claim 1 wherein the analyzing the physical characteristics of the user further comprises:
capturing one or more images of the user with a camera; and
identifying user interest from the one or more images of the user, wherein the physical characteristics of the user include at least one of a group consisting of: a facial expression of the user, an eye movement of the user, and a body movement of the user.

3. The method of claim 1 wherein the analyzing the physical characteristics of the user further comprises:
recording audio from the user with a microphone; and
identifying user interest from recorded audio using natural language processing and sentiment analysis, wherein the physical characteristics of the user include words from the user or audible sounds from the user.

4. The method of claim 1 wherein the analyzing the physical characteristics of the user further comprises:
capturing biometric data from the user at the first time; and
identifying user interest from the biometric data captured at the first time.

5. The method of claim 1 wherein the determining whether the is interesting to the user further comprises:
obtaining profile data of the user, wherein the profile data is selected from a group consisting of: a history of items purchased or viewed by the user, interests of the user determined from social media, product category requirements, and attribute requirements of the user; and
identifying user interest from the profile data of the user.

6. The method of claim 1 wherein the classifying each item of the plurality of items displayed on the first page based on the determined interest to the user is based on a machine learning classification model that predicts interest of the user in each item of the plurality of items.

7. The method of claim 1 wherein the determining a correlation factor between the user and each item classified as interesting to the user includes calculating a Pearson correlation factor between the user and the item classified as interesting to the user.

8. The method of claim 1 wherein the webpage is included in a first website and the identified detailed information includes detailed information from the first website along with detailed information collected from a second web site about the first one of the plurality of items.

9. A computer program product for making personalized selections from a list of search items on a webpage, the computer program product comprising:
a computer readable storage device having program instructions embodied therewith, the program instructions executable by a processor to cause the processor to perform a method comprising:
displaying a plurality of items to a user on a first page on a display screen of an electronic device;
determining whether an item is interesting to the user by analyzing physical characteristics of the user;
classifying each item of the plurality of items displayed on the first page based on a determined interest to the user;
determining a correlation factor between the user and the item when the item is classified as interesting to the user;
for at least the first one of the plurality of items determined to have a correlation factor above a predetermined threshold, identifying detailed information about a first one of the plurality of items; and
automatically displaying the identified detailed information about a first one of the plurality of items without receiving an input indicating a selection of a first one of the plurality of items from a hand-operated input device.

10. The computer program product of claim 9 wherein the analyzing the physical characteristics of the user further comprises:
capturing one or more images of the user with a camera; and
identifying user interest from the one or more images of the user, wherein the physical characteristics of the user include at least one of a group consisting of: a facial expression of the user, an eye movement of the user, and a body movement of the user.

11. The computer program product of claim 9 wherein the analyzing the physical characteristics of the user further comprises:
recording audio from the user with a microphone; and
identifying user interest from recorded audio using natural language processing and sentiment analysis, wherein the physical characteristics of the user include words from the user or audible sounds from the user.

12. The computer program product of claim 9 wherein the analyzing the physical characteristics of the user further comprises:
capturing biometric data from the user at the first time; and
identifying user interest from the biometric data captured at the first time.

13. The computer program product of claim 9, wherein the determining whether the item is interesting to the user further comprises:
obtaining profile data of the user, wherein the profile data is selected from a group consisting of: a history of items purchased or viewed by the user, interests of the user determined from social media, product category requirements, and attribute requirements of the user; and
identifying user interest from the profile data of the user.

14. The computer program product of claim 9 wherein the classifying of each item of the plurality of items displayed on the first page based on the determined interest to the user is based on a machine learning classification model that predicts interest of the user in each item of the plurality of items.

15. The computer program product of claim 9 wherein the determining a correlation factor between the user and each item classified as interesting to the user includes calculating a Pearson correlation factor between the user and the item classified as interesting to the user.

16. The computer program product of claim 9 wherein the webpage is included in a first website and the identified detailed information includes detailed information from the first website along with detailed information collected from a second web site about the first one of the plurality of items.

17. A computer system for making personalized selections from a list of search items on a webpage, the computer system comprising:
 one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
  displaying a plurality of items to a user on a first page on a display screen of an electronic device;
  determining whether an item is interesting to the user by analyzing physical characteristics of the user;
  classifying each item of the plurality of items displayed on the first page based on a determined interest to the user;
  determining a correlation factor between the user and the item when the item is classified as interesting to the user;
  for at least the first one of the plurality of items determined to have a correlation factor above a predetermined threshold, identifying detailed information about a first one of the plurality of items; and
  automatically displaying the identified detailed information about a first one of the plurality of items without receiving an input indicating a selection of a first one of the plurality of items from a hand-operated input device.

18. The computer system of claim 17 wherein the analyzing the physical characteristics of the user further comprises:
 capturing one or more images of the user with a camera; and
 identifying user interest from the one or more images of the user captured, wherein the physical characteristics of the user include at least one of a group consisting of: a facial expression of the user, an eye movement of the user, and a body movement of the user.

19. The computer system of claim 17 wherein the classifying of each item of the plurality of items displayed on the first page based on the determined interest to the user is based on a machine learning classification model that predicts interest of the user in each item of the plurality of items.

20. The computer system of claim 17 wherein the determining a correlation factor between the user and each item classified as interesting to the user includes calculating a Pearson correlation factor between the user and the item classified as interesting to the user.

* * * * *